United States Patent
Bereketli et al.

(10) Patent No.: US 10,887,698 B2
(45) Date of Patent: Jan. 5, 2021

(54) METHOD FOR ACOUSTIC DETECTION OF SHOOTER LOCATION

(71) Applicant: ASELSAN ELEKTRONIK SANAYI VE TICARET ANONIM SIRKETI, Ankara (TR)

(72) Inventors: Alper Bereketli, Ankara (TR); Sinan Avsar, Ankara (TR); Emir Dogan, Ankara (TR); Mehmet Donus, Ankara (TR)

(73) Assignee: ASELSAN ELETRONIK SANAYI VE TICARET ANONIM SIRKETI, Ankara (TR)

( * ) Notice: Subject to any disclaimer, the term of this patent is extended or adjusted under 35 U.S.C. 154(b) by 149 days.

(21) Appl. No.: 16/232,094

(22) Filed: Dec. 26, 2018

(65) Prior Publication Data

US 2020/0029157 A1 Jan. 23, 2020

(30) Foreign Application Priority Data

Dec. 26, 2017 (TR) .............................. a 2017 21987

(51) Int. Cl.
- *H04R 5/04* (2006.01)
- *G06F 17/14* (2006.01)
- *G10L 25/51* (2013.01)
- *H04R 3/00* (2006.01)

(52) U.S. Cl.
CPC .............. *H04R 5/04* (2013.01); *G06F 17/142* (2013.01); *G10L 25/51* (2013.01); *H04R 3/005* (2013.01)

(58) Field of Classification Search
CPC .......... H04R 5/04; H04R 3/005; G06F 17/142; G10L 25/51
See application file for complete search history.

(56) References Cited

U.S. PATENT DOCUMENTS

| | | |
|---|---|---|
| 2,434,644 A | 1/1948 | Fairweather |
| 2,966,657 A | 12/1960 | Price |
| 5,241,518 A | 8/1993 | McNelis et al. |
| 5,258,962 A | 11/1993 | Karlsen |
| 5,544,129 A | 8/1996 | McNelis |

(Continued)

OTHER PUBLICATIONS

Taylor et al., "Development of a matched filter detector for acoustic signals at local distances from small explosions," The Journal of the Acoustical Society of America 134, EL84 (2013); doi: 10.1121/1.4809779 (Year: 2013).*

(Continued)

*Primary Examiner* — Michelle M Koeth
(74) *Attorney, Agent, or Firm* — Bayramoglu Law Offices LLC

(57) ABSTRACT

A method for acoustic detection of shooter location includes the following steps: receiving acoustic signals by a microphone array; detecting muzzle blast (MB) and shock wave (SW) signals through matched filter and cross correlation processes; transforming the detected MB and SW signals from time domain into frequency domain; beamforming the signals by means of the Delay and Sum method in frequency domain; estimating the direction of arrival (DOA) for the MB and SW signals by finding the azimuth and elevation which give the maximum power of the beamforming response; performing range estimation using the difference between the arrival time of the MB and SW signals together with the DOA estimations.

9 Claims, 1 Drawing Sheet

(56) References Cited

U.S. PATENT DOCUMENTS

| | | |
|---|---|---|
| 5,781,505 A | 7/1998 | Rowland |
| 5,930,202 A | 7/1999 | Duckworth et al. |
| 6,178,141 B1 | 1/2001 | Duckworth et al. |
| 6,563,763 B2 | 5/2003 | McNelis |
| 6,669,477 B2 | 12/2003 | Hulet |
| 6,847,587 B2 | 1/2005 | Patterson et al. |
| 6,965,312 B2 | 11/2005 | Lerg |
| 7,126,877 B2 | 10/2006 | Barger et al. |
| 7,139,222 B1 | 11/2006 | Baxter et al. |
| 7,190,633 B2 | 3/2007 | Brinn et al. |
| 7,266,045 B2 | 9/2007 | Baxter et al. |
| 7,292,501 B2 | 11/2007 | Barger |
| 7,408,840 B2 | 8/2008 | Barger et al. |
| 7,433,266 B2 | 10/2008 | Ledeczi et al. |
| 7,495,998 B1 | 2/2009 | Deligeorges |
| 7,583,808 B2 | 9/2009 | Smaragdis et al. |
| 7,586,812 B2 | 9/2009 | Fisher et al. |
| 8,005,631 B2 * | 8/2011 | Barger .............. G01S 5/22 702/60 |
| 8,149,649 B1 | 4/2012 | Brinn et al. |
| 9,488,442 B2 | 11/2016 | Varga et al. |
| 9,651,649 B1 | 5/2017 | Salloum et al. |
| 2007/0244952 A1 * | 10/2007 | Kennedy .......... G06K 9/0055 708/422 |
| 2008/0247274 A1 * | 10/2008 | Seltzer .............. G01S 3/86 367/125 |
| 2014/0269199 A1 * | 9/2014 | Weldon ............. G01S 5/18 367/124 |

OTHER PUBLICATIONS

Ramos et al., "Delay-and-sum beamforming for direction of arrival estimation applied to gunshot acoustics," Proc. SPIE 8019, Sensors, and Command, Control, Communications, and Intelligence (C3I) Technologies for Homeland Security and Homeland Defense X, 80190U (Jun. 2, 2011); doi: 10.1117/12.886833 (Year: 2011).*

Sinha et al., "Sniper localization using passive acoustic measurements over an ad-hoc sensor array," 2015 Twenty First National Conference on Communications (NCC), Mumbai, 2015, pp. 1-6, doi: 10.1109/NCC.2015.7084859 (Year: 2015).*

Beck, S. D.,Nakasone, H, Marr, K. W. (2011). "Variations in recorded acoustic gunshot waveforms generated by small firearms," J. Acoust. Soc. Am. 129(4), 1748-1759.

Stoughton, R. (1997). "Measurements of small-caliber ballistic shock waves in air," J. Acoust. Soc. Am. 102(2), 781-787.

B.D. Van Veen, K.M. Buckley, "Beamforming: A Versatile Approach to Spatial Filtering", IEEE Acoustics, Speech and Signal Processing (ASSP) Magazine, 4-24 (1988).

* cited by examiner

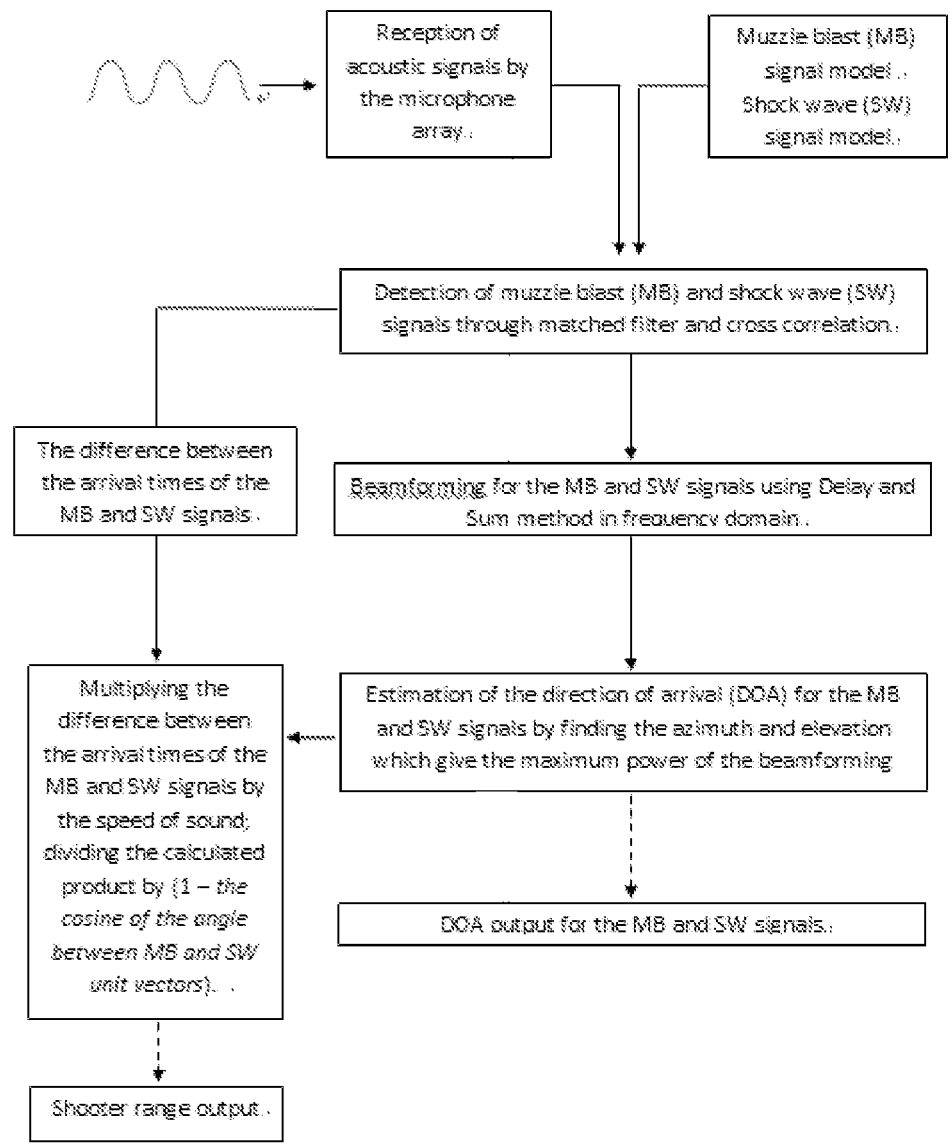

METHOD FOR ACOUSTIC DETECTION OF SHOOTER LOCATION

CROSS REFERENCE TO THE RELATED APPLICATIONS

This application is based upon and claims priority to Turkey Patent Application No. 2017/21987, filed on Dec. 26, 2017, the entire contents of which are incorporated herein by reference.

TECHNICAL FIELD

The present invention is particularly related to a beamforming-based method for acoustic detection of shooter location. In the method of the present invention, the direction and range of the shooter are estimated by means of signal processing methods based on beamforming using a microphone array.

BACKGROUND

It is important to determine the location of a shooter for ensuring the security of police stations, vehicles, convoys, borders, troops, society and public and/or for sniper detection. The detection of shooter location is realized generally by the detection of acoustic signals such as muzzle blast (MB) and shock wave (SW) associated with the projectile, and by the estimation of the direction and range of the aforementioned signals by using various methods. In order to detect the acoustic signals and perform the aforementioned estimations, a single microphone array or distributed microphone arrays are used. Acoustic signals incident on the microphone array are processed using different methods and estimations are obtained.

The publication No. U.S. Pat. No. 2,434,644, which is comprised in the state of the art, direction of arrival (DOA) estimation according to the time differences of arrival (TDOA) of the shock wave is described. In the publication No. U.S. Pat. No. 2,966,657, DOA is estimated by collecting voltage polarizations from directional and non-directional microphones by means of the cathode ray tube technology. In publications No. U.S. Pat. No. 5,241,518 and No. U.S. Pat. No. 5,258,962 how the direction of a supersonic projectile is determined by means of a plurality of microphones is described. Similarly, in the publication No. U.S. Pat. No. 6,669,477, a solution method is presented for the bullet trajectory estimation according to the TDOA of acoustic signals to six microphones that are located discretely. In publication No. U.S. Pat. No. 6,563,763, a solution is proposed to improve the accuracy of bullet direction estimations. In publications No. U.S. Pat. No. 7,190,633 and No. U.S. Pat. No. 8,149,649, DOA is estimated according to the TDOA of the SW signal. The effects of the microphone location information on DOA estimation are analyzed, and a solution is proposed to reduce estimation errors.

In the publication No. U.S. Pat. No. 5,544,129, DOA estimation is based on the TDOA of acoustic signals on three microphones. In the publication No. U.S. Pat. No. 5,781,505, DOA estimation and localization are achieved using more than one array of microphones and optical sensors. In the publications No. U.S. Pat. Nos. 5,930,202 and 6,178,141, shooting location is estimated by using time of arrival (TOA) information with a plurality of microphone arrays. The publication No. U.S. Pat. No. 6,965,312 explains shooter localization in a wireless communication network of multiple microphone arrays located on helmets of soldiers.

Another solution based on the communication network among wearable microphone arrays is described in the publication No. U.S. Pat. No. 7,266,045. In publications No. U.S. Pat. No. 7,126,877 and No. U.S. Pat. No. 7,408,840, target localization is performed by using the TDOA of acoustic signals with at least five or seven microphones separated by a distance of at least 1 meter. U.S. Pat. Nos. 6,847,587, 7,139,222, 7,433,266 and 7,586,812 can be shown as examples of publications in which the DOA estimation is accomplished by using distributed microphone array networks.

U.S. Pat. No. 7,292,501 presents a system of two sensor units that are at least one meter apart and contain three accelerometers, where TDOA of SW signals are used for target localization. In U.S. Pat. No. 7,495,998, acoustic sensor pairs are located with predetermined intervals according to the application. Shooter positioning is achieved by using the frequency spectrum of the incoming acoustic signals, time delays, amplitude differences and periodicity information. In fixed or mobile platforms and wearable system applications, usage of multi sensor networks is proposed. The effect of increasing the number of the sensors on decreasing the estimation uncertainty is explained.

In the publication No. U.S. Pat. No. 7,583,808, microphones distributed within the task field, are first trained with acoustic patterns arriving from different directions. Subsequently, a decision mechanism for determining the most probable location of the target through cross correlation of acoustic signals is described.

The sniper detection system proposed in U.S. Pat. No. 9,488,442 uses camera displays and radar systems together with a microphone array in order to locate and track the shooter. Visual, acoustic and thermal information obtained from the shooting location are used for estimation.

In the publication No. U.S. Pat. No. 9,651,649, DOA estimation is performed by using the TDOA of signals within a distributed network of microphones. A system, where the network is partitioned into clusters of at least four microphones, is described.

The approach generally used in the state of the art systems and methods is based on the inference of the DOA of MB and SW signals from their TDOA at array microphones. DOA estimation with time domain signals brings a lower limit to microphone spacing. In this approach, microphone spacing can be less than one meter only at very high sampling frequencies. Even in this case, DOA estimation performance may not be satisfactory. Moreover, high sampling frequencies increase hardware and software costs.

In most of the state of the art systems and methods, sensor units distributed within the mission region are used. This situation, together with signal processing, leads to network communication and synchronization problems among sensor units. The required processing load for network communication and synchronization increases hardware and software costs. On the other hand, transfer of raw data from sensor units to a central processing unit causes delay, which reduces the validity and accuracy of estimations.

Due to the usage of optical and thermal systems together with acoustic sensors, most of the detection and localization systems are expensive, complicated, and vulnerable to environmental conditions.

SUMMARY

The present invention introduces a novel approach for shooter localization. In the method of the present invention, acoustic signals that reach the microphones are transformed into frequency domain and DOA estimation for the signals is realized in frequency domain. The susceptibility of the frequency domain DOA estimation to microphone aperture (the maximum distance between the most distant two microphones in the array) and sampling frequency is much lower than that of TDOA-based methods. This allows for lowering the array dimension to the half of the wavelength at 1 kHz (approximately 17 cm). Therefore, the present invention enables portable and wearable usage scenarios by adjusting microphone aperture according to application requirements.

The present invention avoids the necessity to use a distributed network, and the invention enables DOA estimation and localization of the shooter with a system using only acoustic data. Therefore, problems that affect the performance of the state of the art systems, such as delay, communication security, synchronization requirements and hardware costs, are prevented.

The aim of this invention is to introduce a beamforming-based method for detection of shooter location. Direction and range of the shooter location is detected using a beamforming-based signal processing method with a microphone array.

Another aim of the present invention is to ensure the security of police stations, vehicles, convoys, borders, troops, society and public and/or for sniper detection through shooter localization.

BRIEF DESCRIPTION OF THE DRAWINGS

A representative application of the method achieving the objectives of the present invention for shooter localization is illustrated in the attached FIGURES in order to clarify the details of the invention. The details of the description shall be considered by taking the whole description into account. In these FIGURES;

FIG. 1 is a flowchart of a representative application of the method of the present invention.

DETAILED DESCRIPTION OF THE EMBODIMENTS

In the method of the present invention, acoustic signals are received by an array of acoustic receivers. Microphones, especially condenser type microphones; dynamic, capacitive, stripped, crystal, electret, and carbon powdered microphones can be used as acoustic receivers without limiting the invention. First, an MB or an SW is detected from the received acoustic signals. The received acoustic signals are cross correlated with model signals (the acoustic waveforms of the MB and SW signals) by using a matched filter. The received signal is matched with the MB or the SW model according to the result of the cross correlation. If the received acoustic signal is an MB or an SW signal, the detected MB or SW signal is converted from time domain into frequency domain by using Fast Fourier Transform (FFT).

Using the MB and SW signals received by the acoustic microphone array, beams are created for every possible direction in three dimensional space by Delay and Sum beamforming in frequency domain [B. D. Van Veen, K M Buckley, "*Beamforming: A Versatile Approach to Spatial Filtering*", *IEEE Acoustics, Speech and Signal Processing (ASSP) Magazine*, 4-24 (1988)]. DOA estimations for the MB and the SW signals are the maximum power directions of the MB and the SW beams, respectively. The range (distance) that generates the arrival time difference of the MB and SW signals is calculated. The location of the shooter is determined as a result of the estimated DOA and range.

The processes in the preferred embodiment of the invention are as follows:

Acoustic Receiver Array

The method of the invention comprises an array that consists of at least two acoustic receivers that are appropriate for receiving acoustic signals such as sound waves. In a preferred embodiment of the invention an acoustic receiver array that comprises condenser type microphones as acoustic receivers. The acoustic receiver aperture in the array is approximately equal to the wavelength at 1 kHz. The acoustic receiver aperture is the distance between two furthest acoustic receivers in the array.

The Detection of the Muzzle Blast (MB) and Shock Wave (SW) Signals

The acoustic signals received by the acoustic receiver array are compared with the acoustic model waveforms of the MB and SW signals. The received acoustic signal which is matched with one of the signal models is determined as an MB signal or an SW signal correspondingly. The aforementioned comparison is made by taking the cross correlation of the MB model signal and the SW signal model with the received acoustic signal by using a matched filter.

Generation of the MB Signal Model

The MB signal model can preferably be formed as follows;

The modified Friedlander wave model is used for the MB signal model [Beck, S. D., Nakasone, H., Marr, K. W. (2011). "*Variations in recorded acoustic gunshot waveforms generated by small firearms,*" *J. Acoust. Soc. Am.* 129(4), 1748-1759.].

The positive phase part of the MB is calculated by the following equation;

$$pp = Psp^*(1-tp/T0p).^*\exp(b^*tp/T0p)$$

Terminology pp=the positive phase part of the MB
Psp=the maximum pressure of the positive phase (in Pascals)
tp=the time vector for the positive phase (in seconds)
T0p=the duration of the positive phase (in seconds)
b=an exponential coefficient (unitless)
*=multiplication
.*=element-wise multiplication In addition to the positive phase part, the second part of the MB signal, which is named as the negative phase, is calculated by the following equation;

$$pn = -Pnp^*(tn/T0n).^*(1-tn/T0n).^*\exp(-4^*tn/T0n)$$

Terminology pn=the negative phase part of the MB
Pnp=the maximum pressure of the negative phase (in Pascals)
tn=the time vector of the negative phase (in seconds)
T0n=the duration of the negative phase (in seconds)
*=multiplication
.*=element-wise multiplication The MB signal model is obtained by concatenating the positive and negative phase parts.

Generation of the SW Signal Model

The SW signal model can be preferably created as follows;

For the SW signal model, Whitham wave model [Stoughton, R. (1997). *"Measurements of small-caliber ballistic shock waves in air,"* J. Acoust. Soc. Am. 102(2), 781-787.] is used.

$$p\_kernel\_SD = P\max * (1 - 2*(t/t\max))$$

Terminology p_kernel_S=SW signal model
t=time in seconds $$P\max = (0.53 * P0 * (M^2-1)^{(1/8)} * d) / (b^{(3/4)} * l^{(1/4)})$$

P0=ambient pressure (in Pascals)
M=v/c Mach number (unitless)
v=speed of the bullet (meters/seconds)
c=speed of sound (meters/seconds)
d=caliber (in meters)
b=miss distance (in meters)
l=bullet length (in meters)

$$t\max = (1.82 * M * b^{(1/4)} * d) / (c * (M^2-1)^{(3/8)} * l^{(1/4)})$$

M=v/c Mach number (unitless)
v=speed of the bullet (meters/seconds)
c=speed of sound (meters/seconds)
d=caliber (in meters)
b=miss distance (in meters)
l=bullet length (in meters)

Matched Filter and Cross Correlation Process

Separate cross correlations (matched filter) are carried out for the detection of MB and SW signals. The cross correlation between the received signal (vector x of size Nx×1) and the theoretical signal model (vector y of size Ny×1) corresponding to the m-th delay is calculated as follows:

$$Cxy(m) = \Sigma_n [x(n) * y(n+m)]$$

Terminology

Cxy(m)=Cross correlation
x(n)=Received signal
y=Theoretical signal model
n=Time index
m=Time delay index The time delay index (m) stands for the time difference in matching the received signal with the MB or SW signal model. The summation is calculated over the time index n.

If a matching occurs as a result of the cross correlation, the received acoustic signal is detected either as an MB or as an SW signal.

Delay and Sum Beamforming

If an MB or an SW is detected, the received acoustic signal is transformed from time domain into frequency domain by means of the Fast Fourier transform (FFT). The aforementioned transformation process is preferably performed as follows;

The acoustic signal of size (Nt×M), which is received by M microphones at time index N is transformed into frequency domain by FFT:

$$X(l,m) = \Sigma_n x(n,m) * \exp(-i * 2 * \pi * n * l / Nt)$$

Terminology

X(l, m)=FFT output of the signal of length Nt received by M microphones
x(n, m)=The signal received by the microphones
$i = (-1)^{(1/2)}$ complex number
l=[0, Nfft−1] frequency index
m=[1, M] acoustic receiver channel
n=[1, Nt] time index
Nt=Number of samples in the received signal The maximum amplitude in any channel (for example, at the 2nd channel/column that belongs to a reference acoustic receiver) of the Fourier coefficient matrix X with dimensions of ((Nfft/2+1)×M) is found. The frequency index (l0) and the frequency value (f0) corresponding to the maximum amplitude is determined.

Subsequently, using the MB and SW signals received by the acoustic microphone array, beams are created for every possible direction in three dimensional space by Delay and Sum beamforming in frequency domain [B. D. Van Veen, K. M. Buckley, *"Beamforming: A Versatile Approach to Spatial Filtering"*, IEEE Acoustics, Speech and Signal Processing (ASSP) Magazine, 4-24 (1988)].

An MB or an SW signal is incident on each of the array microphones with a different delay. This delay is due to the spatial location differences of the microphones in the acoustic receiver array. In the Delay and Sum method, for an acoustic signal incident on the microphone array, delays are calculated in frequency domain for every possible DOA. These delays are applied to the received acoustic signals, and then the signals are summed up to form a beam for every possible DOA in three dimensional space. The abovementioned procedure is carried out for MB and SW signals.

Azimuth ($\psi$) vector of size (359×1) and elevation ($\theta$) vector of size (181×1) are created with a resolution of 1 degree for [0, 359] degrees and [−90, 90] degrees, respectively.

The beamforming response corresponding to the (azimuth $\psi$, elevation $\theta$) angle pair is calculated as:

$$r(\psi,\theta) = \Sigma_m X(l0,m) * w(m)$$

Terminology

X(l0, m)=Fourier coefficient at the frequency corresponding to the maximum amplitude of channel m $$w(m) = (1/M) * \exp(-i * (2*\pi*f0/c) * Rs(1,m) * (\cos(\psi - Rs(2,m)) * \cos(\theta) * \cos(Rs(3,m)) + \sin(\theta) * \sin(Rs(3,m))))$$

Rs(1, m)=Distance of m-th microphone to the center of the receiver array
Rs(2, m)=Azimuth of m-th microphone with respect to the center of the receiver array
Rs(3, m)=Elevation of m-th microphone with respect to the center of the receiver array DOA Estimation for MB and SW Signals DOA estimations for the MB and the SW signals are the directions with the maximum power for the MB and the SW beams, respectively.

The signal power in each direction of the beam is given by the following equation:

$$b(\psi,\theta) = |r(\psi,\theta)|^2$$

Terminology $r(\psi,\theta)$ = The beamforming response corresponding to the (azimuth ($\psi$), elevation ($\theta$) angle pair
$b(\psi, \theta)$ = Signal power in each direction After beamforming for all azimuth and elevation directions, the azimuth and the elevation of the incoming acoustic signal is given by the maximum of the beamforming response:

$$(\psi_0, \theta_0) = \max_{(\psi,\theta)}(b(\psi,\theta))$$

Terminology $\psi_0$ = The azimuth DOA with the maximum response
$\theta_0$ = The elevation DOA with the maximum response

Range Estimation

The range (distance) that generates the arrival time difference of the MB and SW signals is calculated. The location of the shooter is determined as a result of the estimated DOA and range.

The range is calculated by using the difference of velocities of MB and SW signals in air. Their arrival times at the acoustic receiver array are different. In a preferred embodiment of the invention, the difference between the arrival times of MB and SW signals is taken as the difference between the starting points of these signals, which are determined according to their cross correlations with the corresponding signal models.

Using the (azimuth, elevation) DOA estimations for MB and SW signals, which are denoted by ($\psi_{SW}$, $\theta_{SW}$) and ($\psi_{MB}$, $\theta_{MB}$), unit vectors in these DOA directions are generated.

$$u_{SW} = [\cos(\psi_{SW})^* \cos(\theta_{SW}), \sin(\psi_{SW})^* \cos(\theta_{SW}), \sin(\theta_{SW})]^T$$

$$u_{MB} = [\cos(\psi_{MB})^* \cos(\theta_{MB}), \sin(\psi_{MB})^* \cos(\theta_{MB}), \sin(\theta_{MB})]^T$$

Terminology $\psi_{SW}$ = The azimuth DOA estimation for the SW signal
$\theta_{SW}$ = The elevation DOA estimation for the SW signal
$\psi_{MB}$ = The azimuth DOA estimation for the MB signal
$\theta_{MB}$ = The elevation DOA estimation for the MB signal
$u_{SD}$ = Unit vector for the SW signal that has a DOA of ($\psi_{SW}$, $\theta_{SW}$)
$u_{MB}$ = Unit vector for the MB signal that has a DOA of ($\psi_{MB}$, $\theta_{MB}$)

The cosine of the angle $\alpha$ between these two unit vectors is obtained by means of scalar multiplication:

$$\cos(\alpha) = (u_{SW}(1)^* u_{MB}(1)) + (u_{SW}(2)^* u_{MB}(2)) + (u_{SW}(3)^* u_{MB}(3))$$

Consequently, the firing range is calculated by using $\Delta t$ value that is the difference between the arrival times of the MB and SW signals. The range value is calculated by $$\text{range} = (\Delta t^* c)/(1 - \cos(\alpha)).$$

What is claimed is:

1. A method for an acoustic determination of shooter location, comprising the following procedural steps:
receiving acoustic signals by a microphone array;
detecting a muzzle blast (MB) signal and shock wave (SW) signal through a matched filter and cross correlation processes;
transforming the MB signal and SW signal from a time domain into a frequency domain;
beamforming the MB signal and SW signal by means of a Delay and Sum method in the frequency domain to obtain a MB beam and a SW beam;
estimating a direction of arrival (DOA) for the MB signal and a direction of arrival (DOA) for the SW signal by finding an azimuth and elevation, wherein the azimuth and elevation indicates the DOA of the MB signal having a maximum power of the MB beam and the DOA of the SW signal having a maximum power of the SW beam;
performing a range estimation using a difference between arrival time of the MB signal and arrival time of the SW signal, the DOA for the MB signal, and the DOA for the SW signal;
performing the cross correlation process on each acoustic signal of the acoustic signals with an MB signal model and an SW signal model by using the matched filter;
in case a matching between the each acoustic signal and the MB signal model or the SW signal model occurs, detecting the each acoustic signal as the MB signal or the SW signal accordingly, and
wherein when calculating the difference between the arrival time of the MB signal and the arrival time of the SW signal, a starting time of the MB signal is given by an index of a maximum of the cross correlation between the MB signal and the corresponding MB signal model, and a starting time of the SW signal is given by an index of the maximum of the cross correlation between the SW signal and the corresponding SW signal model.

2. The method according to claim 1, wherein the MB signal model is a modified Friedlander wave model.

3. The method according to claim 1, wherein the SW signal model is a Whitham wave model.

4. The method according to claim 1, wherein the MB signal and the SW signal are transformed from the time domain into the frequency domain through a Fast Fourier Transform.

5. The method according to claim 1, further comprising the following steps: calculating a delay of the DOA for the MB signal incident on the microphones in the frequency domain; applying the delay to the MB signal incident on the microphones to obtain a delayed MB signal; summing the delayed MB signal to form the MB beam through the Delay and Sum method in three dimensional space.

6. The method according to claim 1, further comprising the following steps: calculating a delay of the DOA for the SW signal incident on the microphones in the frequency domain; applying the delay to the SW signal incident on the microphones to obtain a delayed SW signal; summing the delayed SW signal to form the SW beam through the Delay and Sum method in three dimensional space.

7. The method according to claim 1, wherein the DOA for the MB signal is a direction with the maximum power of the MB beam.

8. The method according to claim 1, wherein the DOA for the SW signal is a direction with the maximum power of the SW beam.

9. The method according to claim 1, wherein in the step of performing the range estimation, a range is calculated by using an MB unit vector in the DOA of the MB signal and an SW unit vector in the DOA of the SW signal; the difference between the arrival time of the MB signal and the SW signal is multiplied by the speed of sound to obtain a calculated product; and the calculated product is divided by (1−the cosine of an angle between the MB unit vector and the SW unit vector).

\* \* \* \* \*